United States Patent
Moon (10) Patent No.: US 10,400,141 B2
(45) Date of Patent: Sep. 3, 2019

(54) CONDUCTIVE ADHESIVE TAPE USING COMPRESSIBLE CONDUCTIVE POWDER AND MANUFACTURING METHOD THEREOF

(71) Applicants: Truss Co., Ltd., Incheon (KR); Ho Seup Moon, Incheon (KR)

(72) Inventor: Ho Seup Moon, Incheon (KR)

(73) Assignee: TRUSS CO., LTD., Incheon (KR)

( * ) Notice: Subject to any disclaimer, the term of this patent is extended or adjusted under 35 U.S.C. 154(b) by 0 days.

(21) Appl. No.: 15/831,548

(22) Filed: Dec. 5, 2017

(65) Prior Publication Data

US 2019/0040286 A1 Feb. 7, 2019

(30) Foreign Application Priority Data

Aug. 3, 2017 (KR) ........................ 10-2017-0098511

(51) Int. Cl.
| | |
|---|---|
| *C09J 9/02* | (2006.01) |
| *C09J 201/00* | (2006.01) |
| *C08K 3/08* | (2006.01) |
| *C09J 11/04* | (2006.01) |
| *C09J 7/38* | (2018.01) |
| *C09J 7/28* | (2018.01) |

(52) U.S. Cl.
CPC . *C09J 9/02* (2013.01); *C09J 7/28* (2018.01); *C09J 7/38* (2018.01); *C09J 11/04* (2013.01); *C09J 201/00* (2013.01); *C08J 2300/26* (2013.01); *C08K 3/08* (2013.01); *C08K 2003/085* (2013.01); *C08K 2003/0812* (2013.01); *C08K 2003/0862* (2013.01); *C08K 2003/0887* (2013.01); *C08K 2201/003* (2013.01); *C09J 2201/602* (2013.01); *C09J 2203/326* (2013.01); *C09J 2205/102* (2013.01); *C09J 2400/16* (2013.01); *C09J 2400/163* (2013.01); *C09J 2467/006* (2013.01)

(58) Field of Classification Search
None
See application file for complete search history.

(56) References Cited

U.S. PATENT DOCUMENTS

| | | | |
|---|---|---|---|
| 2003/0146266 A1* | 8/2003 | Chaudhuri | C09J 9/02 228/175 |
| 2007/0155859 A1* | 7/2007 | Song | C08G 18/10 523/218 |

(Continued)

FOREIGN PATENT DOCUMENTS

| | | |
|---|---|---|
| JP | 5858317 B2 | 2/2016 |
| KR | 10-0310986 B1 | 10/2001 |

(Continued)

*Primary Examiner* — Katie L. Hammer
(74) *Attorney, Agent, or Firm* — KORUS Patent, LLC; Seong Il Jeong (57) ABSTRACT

Provided are a conductive adhesive tape including a compressible conductive powder, which is manufactured by applying a conductive adhesive prepared by mixing a conductive powder having a conductive metal-coated outer surface and an adhesive resin at a certain ratio on one surface or both surfaces of a conductive substrate and is easily and evenly attached to an attachment surface by preventing a protrusion phenomenon through deformable characteristics with respect to pressing, and a manufacturing method thereof.

4 Claims, 8 Drawing Sheets

(56) References Cited

U.S. PATENT DOCUMENTS

| | | | | |
|---|---|---|---|---|
| 2009/0169852 A1* | 7/2009 | Choi | ............................ | C09J 7/00 |
| | | | | 428/220 |
| 2012/0208015 A1* | 8/2012 | Takahira | .................... | B32B 7/06 |
| | | | | 428/355 N |
| 2013/0009105 A1* | 1/2013 | Higuchi | ...................... | C09J 9/02 |
| | | | | 252/500 |
| 2013/0049054 A1* | 2/2013 | Namiki | .................... | H01L 24/06 |
| | | | | 257/98 |
| 2015/0175851 A1* | 6/2015 | Redford | ...................... | C09J 9/02 |
| | | | | 428/323 |
| 2015/0307753 A1* | 10/2015 | Liu | ......................... | C09J 133/20 |
| | | | | 428/313.5 |
| 2015/0359043 A1* | 12/2015 | Kim | ........................ | H05B 3/145 |
| | | | | 156/272.2 |

FOREIGN PATENT DOCUMENTS

KR        10-0390164 B1    7/2003
KR   10-2017-0012827 A    2/2017

* cited by examiner

CONDUCTIVE ADHESIVE TAPE USING COMPRESSIBLE CONDUCTIVE POWDER AND MANUFACTURING METHOD THEREOF

RELATED APPLICATION

This application claims the benefit of Korean Patent Application No. 10-2017-0098511, filed on Aug. 3, 2017, in the Korean Intellectual Property Office, the disclosure of which is incorporated herein in its entirety by reference.

BACKGROUND OF THE INVENTION

1. Field of the Invention

The present invention relates to a conductive adhesive tape using a compressible conductive powder and a manufacturing method thereof, and more particularly, to a conductive adhesive tape including a compressible conductive powder, which is manufactured by applying a conductive adhesive prepared by mixing a conductive powder having a conductive metal-coated outer surface and an adhesive resin at a certain ratio on one surface or both surfaces of a conductive substrate and is easily and evenly attached to an attachment surface by preventing a protrusion phenomenon through deformable characteristics with respect to pressing, and a manufacturing method thereof.

2. Description of the Related Art

Generally, in electronic packaging processes of an organic light-emitting device (OLED), a liquid crystal display (LCD), a plasma display panel (PDP), an organic electroluminescence (EL), and the like, there is a growing need to connect a large number of electrodes, which have a narrow gap therebetween due to an ultrafine gap of a circuit and an increase in connection density, all at once.

In particular, among the electronic packaging processes as described above, the electronic packaging process of the LCD uses a conductive adhesive for mechanical and electrical connections between a flexible printed circuit (FPC) and a glass display.

Meanwhile, examples of the conductive adhesive include an isotropic conductive adhesive and an anisotropic conductive film (ACF). Basically, the conductive adhesive has a form in which monodispersed conductive particles are dispersed in a thermosetting or thermoplastic insulating resin.

In a case where a thickness of an adhesive to be formed is increased to exceed a thickness of 0.02 mm, only when a content of a metal powder contained in the adhesive is considerably increased proportionally as the increased thickness, an adhesive tape including the conductive adhesive as described above has excellent electric flowability. In a case where the thickness of the adhesive exceeds a thickness of 0.04 mm, the increase in the content of the metal powder is not enough for the adhesive tape to have excellent electric flowability. Thus, it is necessary to increase the size of the metal powder.

As described above, when the size of the metal powder is increased, the metal powder may protrude from the surface of the adhesive. This phenomenon appears as a protrusion shape on an appearance of a tape to cause an appearance problem. In addition, when the tape is attached, unattached portions are increased around the protrusion to cause problems in terms of adhesive performance and electrical characteristics of a product.

PRIOR ART DOCUMENT

Patent Document

Patent Document 1: KR 10-0390164
Patent Document 2: KR 10-0310986

SUMMARY OF THE INVENTION

The present invention has been made in an effort to solve the above problems, and another aspect of the present invention is to provide a conductive adhesive tape including a compressible conductive powder, which is manufactured by applying a conductive adhesive prepared by mixing a conductive powder having a conductive metal-coated outer surface and an adhesive resin at a certain ratio on one surface or both surfaces of a conductive substrate and is easily and evenly attached to an attachment surface by preventing a protrusion phenomenon through deformable characteristics with respect to pressing, and a manufacturing method thereof.

Another aspect of the present invention is to provide a conductive adhesive tape manufactured by applying a conductive adhesive prepared by mixing a conductive powder having a metal-coated outer surface and an adhesive resin at a certain ratio on one surface or both surfaces of a conductive substrate, thereby stably maintaining and improving electrical characteristics by preventing a protrusion phenomenon through deformation characteristics with respect to pressing.

According to one or more embodiments, a conductive adhesive tape includes: a conductive substrate; and a conductive adhesive formed on one surface or both surfaces of the conductive substrate, wherein the conductive adhesive includes 0.2-30 parts by weight of a conductive powder with respect to 100 parts by weight of an adhesive resin, and the conductive powder includes a conductive metal layer on an outer circumferential surface thereof.

The conductive powder may have a diameter of 0.001 mm to 1.00 mm.

The conductive metal layer may include at least one selected from the group consisting of copper (Cu), nickel (Ni), silver (Ag), tungsten (W), gold (Au), and aluminum (Al).

The conductive powder may be a polymer deformed by external pressure, may be a formed in single globular shape, an atypical shape, or a hollow body, and may be at least one selected from the group consisting of a styrene-based elastomer, an olefin-based elastomer, a urethane-based elastomer, an amide-based elastomer, a polyester-based elastomer, a natural rubber-based elastomer, and a synthetic rubber-based elastomer.

The adhesive resin may be at least one selected from the group consisting of acryl, silicone, urethane, epoxy, polyethylene (PE), natural rubber, and synthetic rubber.

According to one or more embodiments, a method of manufacturing a conductive adhesive tape includes: (a) expanding an outer shell of a polymer material so as to have a diameter of 0.01 mm to 1.00 mm while maintaining a glass transition temperature (Tg) of the outer shell of the polymer material containing a gas and expanded by heat; (b) cooling and hardening the expanded outer shell; (c) depositing a catalyst on a surface of the hardened outer shell; (d) preparing a conductive powder by coating the catalyst-deposited surface of the outer shell with a conductive metal layer; (e) preparing a conductive adhesive by mixing 0.2 to 30 parts by weight of the conductive powder with respect to 100 parts by weight of an adhesive resin; and (f) manufacturing a conductive adhesive tape by applying the conductive adhesive prepared in the step (e) on one surface or both surfaces of a conductive substrate.

In the step (d), the conductive metal layer may be formed on an outer circumferential surface of the conductive layer by using an electrolytic or electroless plating solution.

The plating solution may include at least one selected from the group consisting of copper (Cu), nickel (Ni), silver (Ag), tungsten (W), gold (Au), and aluminum (Al).

The method may further include attaching a release paper to a surface of the conductive adhesive of the conductive adhesive tape manufactured in the step (f).

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

The above and other aspects, features, and advantages of the present invention will become apparent from the detailed description of the following embodiments in conjunction with the accompanying drawings. It should be understood that the present invention is not limited to the following embodiments and may be embodied in different ways, and that the embodiments are given to provide complete disclosure of the invention and thorough understanding of the present invention to those skilled in the art. The scope of the present invention is defined only by the claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. The same components are designated by the same reference numerals throughout the specification, even though they are depicted in different drawings. Therefore, even if the same or like reference numerals are not referred or described in a related drawing, they may be described with reference to another drawing. Further, even if an element is not assigned a reference numeral in a drawing, this element may be described with reference to other drawings.

Figure 1:
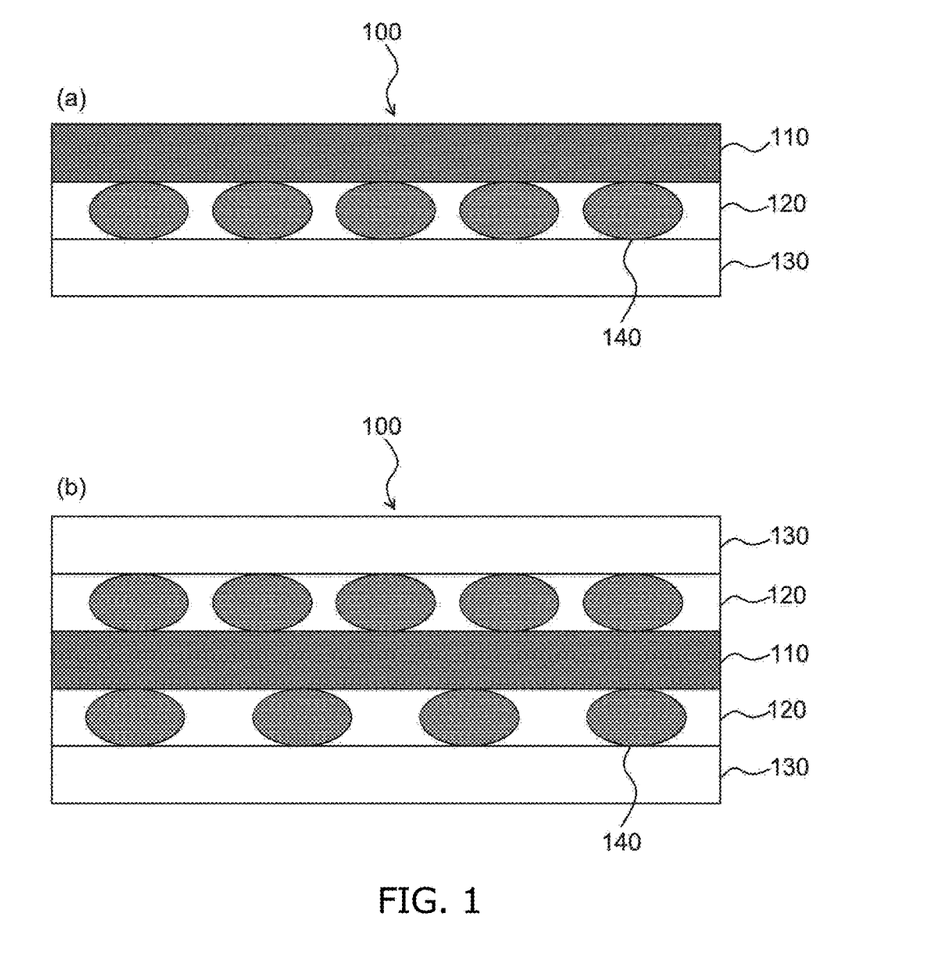
FIG. 1 is a cross-sectional view illustrating a conductive adhesive tape according to the present invention.

FIG. 1 is a cross-sectional view illustrating a conductive adhesive tape according to the present invention. Referring to FIG. 1, the conductive adhesive tape according to the present invention includes a conductive substrate 110, a conductive adhesive 120, a release paper 130, and a conductive powder 140. The conductive adhesive 120 including the conductive powder 140 may be formed on one surface of the conductive substrate 110 as illustrated in (a) of FIG. 1, or may be formed on both surfaces of the conductive substrate 110 as illustrated in (b) of FIG. 1. Alternatively, the conductive adhesive 120 may be formed in a multi-layered structure by staking two or more layers.

The conductive substrate 110 may be made of a metal foil, a plated fiber, or a plated non-woven fabric. In addition, the conductive substrate may further include a light leakage prevention coating layer including conductive back carbon on a surface thereof.

The conductive adhesive 120 may include 0.2 to 30 parts by weight of the compressible conductive powder 140 with respect to 100 parts by weight of an adhesive resin and may be formed by applying a mixture of the adhesive resin and the conductive powder 140 on one surface or both surfaces of the conductive substrate 110 to a certain thickness. The adhesive resin may be one selected from the group consisting of acryl, silicone, urethane, epoxy, polyethylene (PE), natural rubber, synthetic rubber, and mixtures thereof.

The compressible conductive powder 140 has conductivity due to a conductive metal layer plated on an outer circumferential surface thereof through electrolytic or electroless plating. The conductive powder 140 has a diameter of 0.001 mm to 1.00 mm and is deformable when compressed. The conductive metal layer may be made of one selected from the group consisting of copper (Cu), nickel (Ni), silver (Ag), tungsten (W), gold (Au), and mixtures thereof.

The release paper 130 may be attached to a surface of the conductive adhesive 120 to protect an adhesive surface. A film coated with a release agent such as fluorine, silicone, or wax may be used as the release paper. The film may be made of at least one selected from the group consisting of polyester, polyethylene, polypropylene, polyimide, and a paper. In consideration of workability and manufacturing costs, it may be desirable that a polyester film is used.

Figure 2:
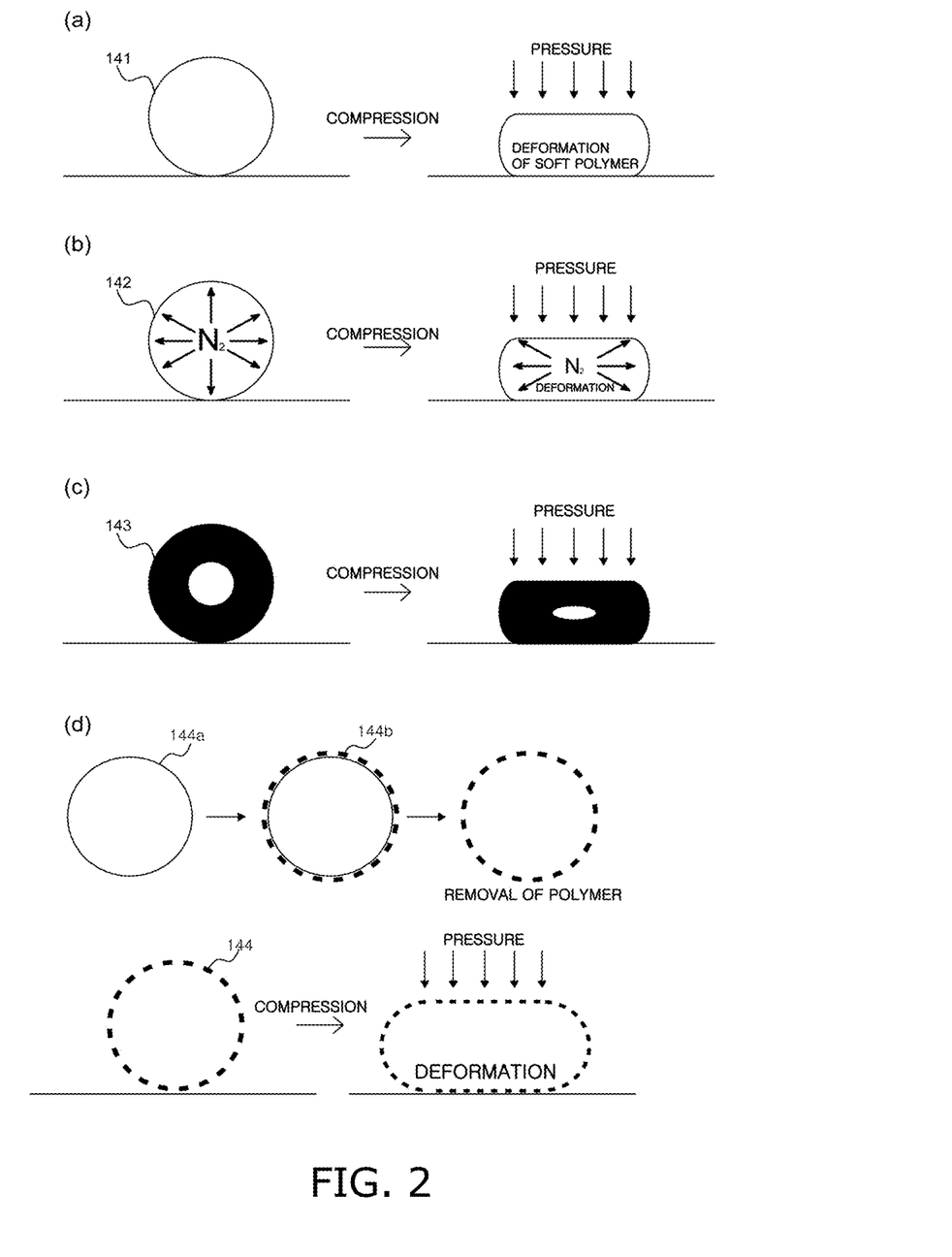
FIG. 2 illustrates compressible conductive powders according to the present invention: (a) of FIG. 2 illustrates a powder prepared by plating a surface of a soft polymer with a metal; (b) of FIG. 2 illustrates a powder prepared by plating a surface of a gas-containing polymer with a metal; (c) of FIG. 2 illustrates a powder prepared by plating a surface of a soft hollow type material with a metal; and (d) of FIG. 2 illustrates a metal-containing powder prepared by plating an outer surface of a polymer with a metal and then removing the polymer.

FIG. 2 illustrates compressible conductive powders 140 according to the present invention. (a) of FIG. 2 illustrates a powder prepared by plating a surface of a soft polymer with a metal. (b) of FIG. 2 illustrates a powder prepared by plating a surface of a gas-containing polymer with a metal. (c) of FIG. 2 illustrates a powder prepared by plating a surface of a soft hollow type material with a metal. (d) of FIG. 2 illustrates a metal-containing powder prepared by plating an outer surface of a polymer with a metal and then removing the polymer. The conductive adhesive tape according to the present invention may include at least one of the powders described above.

In addition, the compressible conductive powder according to the present invention has a strain of 10% or more when compressed.

The conductive powder 140 is desirable to have a particle size of 0.001 mm to 1.00 mm regardless of a color. When the particle size is greater than 1.00 mm, the conductive powder 140 may not exhibit various physical properties of a conductive powder and have difficulty in exhibiting accurate conductivity due to a limit of a thickness when a conductive adhesive is formed.

As described above, the conductive powder 140 in the configuration of the conductive adhesive 120 has a ball shape and is formed to have a single globular shape, an atypical shape, or a hollow body by using a polymer having elastic force to be deformed by external pressure. The conductive powder 140 is prepared by coating an outer surface of powder with a conductive metal layer so as to have conductivity.

The polymer is at least one selected from the group consisting of a styrene-based elastomer, an olefin-based elastomer, a urethane-based elastomer, an amide-based elastomer, a polyester-based elastomer, a natural rubber-based elastomer, and a synthetic rubber-based elastomer.

In the case of (b) of FIG. 2, when the conductive powder 140 is made of the gas-containing polymer material, the contained gas allows the conductive powder 140 to have elastic force to deformed by external pressure. The contained gas allows the conductive powder 140 to continuously maintain physical properties such as impact resistance.

Here, a non-gaseous material may be included instead of the gas, but a gas having excellent strain with respect to external pressure is used such that the compressible conductive powder 140 exhibits cushioning performance in a thin-film product. The use of the gas is very excellent in terms of weight reduction of a product.

Any gases may be used as the gas contained in embodiments of the present invention, but due to possibility of danger such as explosion, nitrogen ($N_2$) gas having high stability is used as illustrated in (b) of FIG. 2.

The conductive metal layer coated through electrolytic or electroless plating is formed by using copper (Cu), nickel (Ni), silver (Ag), tungsten (W), gold (Au), and aluminum (Al), which have excellent electric flowability. It is necessary to maintain a thickness of the conductive metal layer to be 2 nm or more in consideration of electric flowability.

The soft hollow type material of (c) of FIG. 2 may be a thermoplastic elastomer and may be made of at least one selected from the group consisting of a styrene-based elastomer, an olefin-based elastomer, a urethane-based elastomer, an amide-based elastomer, and a polyester-based elastomer according to a used material. The soft hollow type material may be desirably made of at least one selected from the group consisting of a PMMA-based resin, a PU-based resin, a PS-based resin, and an AN-based resin and be more desirably made of at least one selected from the group consisting of expanded polypropylene (EPP), expanded polystyrene (EPS), expanded polyurethane (EPU or ETPU), an acrylonitrile-butadiene-styrene copolymer (ABS), a styrene-acrylonitrile copolymer (SAN), and a styrene-methyl methacrylate copolymer.

In the case of (d) of FIG. 2, after metal plating 144b is performed on an outer surface of an inner polymer spherical body 144a, the inner polymer spherical body 144a may be removed through solvent deposition.

Figure 3:
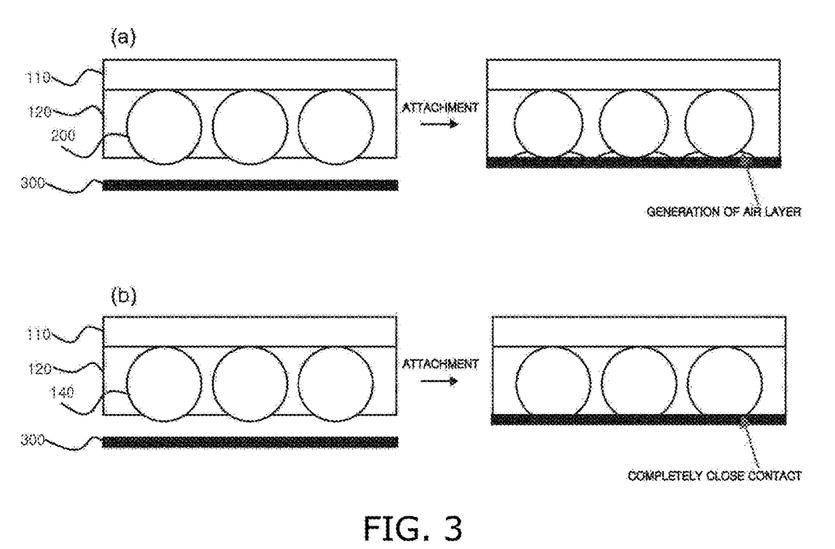
FIG. 3 is a cross-sectional view illustrating an adhesion state of the conductive adhesive tape according to the present invention after the attachment thereof.

FIG. 3 is a cross-sectional view illustrating an adhesion state of the conductive adhesive tape including the compressible conductive powder according to the present invention after an attachment thereof. Referring to FIG. 3, as illustrated in (a) of FIG. 3, after an attachment of a conductive adhesive tape including a general metal powder, due to a repulsion phenomenon around powder, an air layer is formed between the conductive adhesive tape and an adherend 300 to reduce a contact area and lower adhesive power. Thus, as time goes on, a resistance is increased to make it difficult for the conductive adhesive tape to be stably attached to the adherend 300.

In addition, when the size of the general metal powder is increased, the general metal powder may protrude from a surface of an adhesive. This phenomenon appears as a protrusion shape on an appearance of a tape to cause an appearance problem. In addition, when the tape is attached, unattached portions are increased around the protrusion to cause problems in terms of adhesive performance and electrical characteristics of a product.

On the contrary, when the conductive adhesive tape including the compressible conductive powder according to the present invention is attached to the adherend 300 as illustrated in (b) of FIG. 3, the compressible conductive powder may be compressed due to elasticity thereof to increase a contact area, as compared to the general metal powder. Thus, the conductive adhesive tape may have excellent adhesive power, may maintain the contact area over time, and may be stably attached to the adherend 300.

That is, when the conductive adhesive tape according to the present invention is attached under reduced pressure as illustrated in (b) of FIG. 3, as the compressible conductive powder 140 is pressed flat according to pressed pressure, the conductive adhesive tape completely contacts an attachment surface. Accordingly, an attachment area is increased by 50% or more, as compared to the general metal powder. Therefore, adhesive power and electrical characteristics are stably maintained and improved, and an appearance defect caused by a protrusion is solved.

Figure 4:
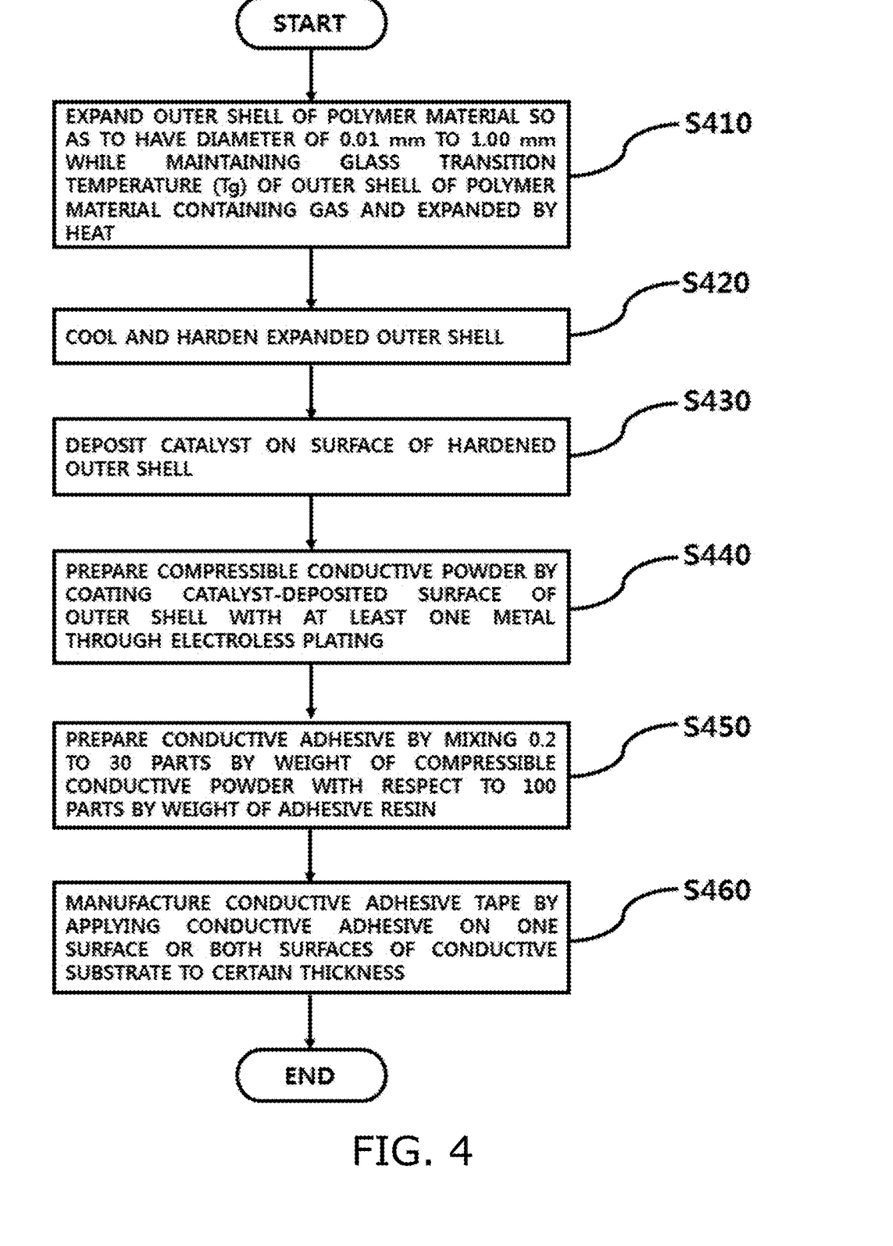
FIG. 4 is a flowchart of a method of manufacturing a conductive adhesive tape, according to the present invention.

FIG. 4 is a flowchart of a method of manufacturing a conductive adhesive tape including a compressible conductive powder, according to the present invention.

Referring to FIG. 4, the method of manufacturing the conductive adhesive tape according to the present invention includes expanding an outer shell of a polymer material so as to have a diameter of 0.01 mm to 1.00 mm while maintaining a glass transition temperature (Tr) of the outer shell of the polymer material containing a gas and expanded by heat (S410), cooling and hardening the expanded outer shell (S420), depositing a catalyst on a surface of the hardened outer shell (S430), preparing a compressible conductive powder by coating the catalyst-deposited surface of the outer shell with at least one metal through electroless plating (S440), preparing a conductive adhesive by mixing 0.2 to 30 parts by weight of the compressible conductive powder with respect to 100 parts by weight of an adhesive resin (S450); and manufacturing a conductive adhesive tape by applying the conductive adhesive prepared in step S450 on one surface or both surfaces of a conductive substrate to a certain thickness (S460).

At this time, the compressible conductive powder may be prepared by plating a surface of the polymer material containing gas with a metal. In addition, the compressible conductive powder may include at least one selected from the group consisting of a powder prepared by plating a surface of a soft polymer with a metal, a powder prepared by plating a surface of a soft hollow type polymer with a metal, and a metal-containing powder prepared by plating an outer surface of a polymer with a metal and then removing the polymer. The compressible conductive powder has a strain of 10% or more when compressed.

In step S420, as the outer shell of the polymer material is hardened by cooling the outer shell to a temperature equal to or less than a critical point at which the outer shell of the polymer material softens, a thickness of an outer shell layer is decreased, and a volume of a contained gas layer is increased.

In step S440, the compressible conductive powder has conductivity by coating an outer surface thereof with a metal layer. The metal may be at least one selected from the group consisting of copper (Cu), nickel (Ni), silver (Ag), tungsten (W), gold (Au), and aluminum (Al). In consideration of electric flowability, it is necessary for the metal layer to maintain a thickness of 2 nm or more. At this time, the compressible conductive powder 140 coated with the metal layer may have a single size or various sizes.

In step S450, the adhesive resin may be one selected from the group consisting of acryl, silicone, urethane, epoxy, polyethylene (PE), natural rubber, synthetic rubber, and mixtures thereof. At this time, a content of the adhesive resin may be adjusted according to adherency between the compressible conductive powders 140 and a size of the compressible conductive powders 140.

The method of manufacturing the conductive adhesive tape may further include attaching a release paper to a surface of the conductive adhesive of the conductive adhesive tape manufactured in step S460.

When the aforementioned conductive powder 140 is used, a total weight may be considerably reduced due to a very low specific gravity of the conductive powder 140. That is, while an existing metal powder has an average specific gravity of 2.7 to 9.8, the conductive powder 140 may have a specific gravity of 2.0 or less. Accordingly, the total weight may be considerably reduced.

Figure 5:
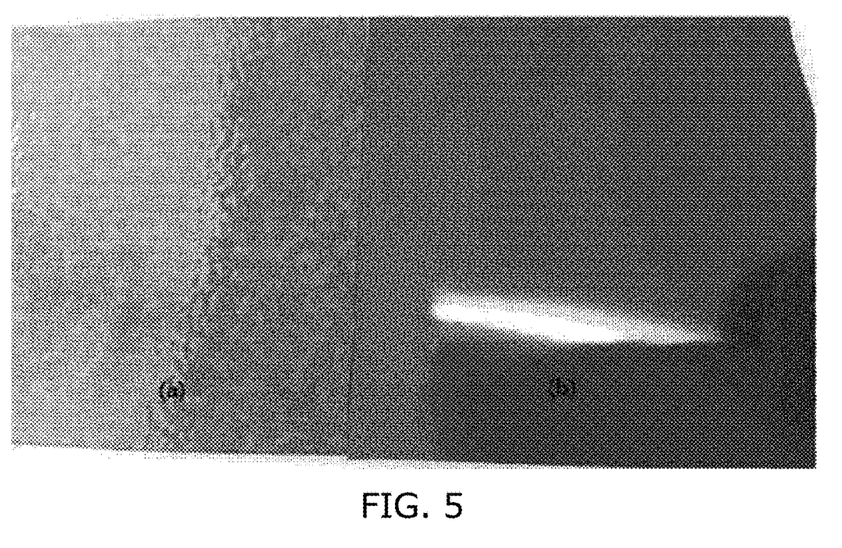
FIG. 5 shows a comparison between (a) a surface image of a conductive adhesive tape including an existing metal powder and (b) a surface image of the conductive adhesive tape according to the present invention.

FIG. 5 shows a comparison between (a) a surface image of a conductive adhesive tape including the existing metal powder and (b) a surface image of the conductive adhesive tape including the compressible conductive powder according to the present invention.

Referring to FIG. 5, in a case where conductive adhesives 120 are prepared to have a thickness of 0.04 mm or more, when conductive materials having the same size are added for comparison, the existing metal powder severely protrudes outward from the conductive adhesive 120 due to a particle size unbalance thereof, a total weight of the added existing metal powder is rapidly increased, a precipitation phenomenon occurs when the existing metal powder is mixed into an adhesive resin. Thus, the difficulty lies in manufacturing and commercializing the existing metal powder.

When an inorganic material plated with an existing metal is used, a size and weight of particles may be improved. However, since an external protrusion phenomenon occurs and powder is not pressed during decompression, an unattached and floating area is generated around the powder to reduce adhesive power and electrical characteristics.

On the contrary, when the compressible conductive powder 140 according to the present invention is used, a particle size may be selected according to a coating thickness, and the compressible conductive powder 140 may have deformation characteristics with respect to pressing to thereby prevent an external protrusion phenomenon. Since an appearance of the compressible conductive powder 140 may be deformed during decompression for attaching the conductive adhesive tape 100, an adhesive material may easily, closely, and evenly contact an attachment surface, thereby stably maintaining adhesive power and electrical characteristics.

Therefore, as described above, until now, there has been a limit to a thickness of a conductive adhesive when a conductive adhesion tape is manufactured, and there have been technical limitations in that an appearance problem is taken into account and the conductive adhesive is partially applied. However, as the technology according to the present invention is applied, the limit to the thickness may be solved, adhesive power may be improved, and the appearance problem may be ameliorated.

Hereinafter, the present invention will be described through Examples. However, Examples should not be construed as limiting the present invention.

EXAMPLES

Examples 1 to 10

An outer shell of a polymer material was expanded so as to have a mean diameter (D50) of 20 μm while a polymer containing a nitrogen gas was maintained at certain temperature (high temperature) such that the outer shell of the polymer material reached glass transition temperature (Tg) and softened. Next, the outer shell of the polymer material was hardened by cooling the outer shell to a temperature equal to or less than a critical point at which the outer shell of the polymer material was sustained. A compressible conductive powder was prepared by depositing a catalyst on a surface of the hardened outer shell and then coating the surface with a nickel metal through electroless plating. Conductive adhesive resins were prepared by mixing the compressible conductive powder with respect to 100 parts by weight of an acrylic-based conductive resin in the following volume ratios (sample Nos. 1 to 10) of Table 1.

TABLE 1

| | (unit: gf/25 mm) | | | | | | | | | |
|---|---|---|---|---|---|---|---|---|---|---|
| Sample No. | 1 | 2 | 3 | 4 | 5 | 6 | 7 | 8 | 9 | 10 |
| Volume ratio (%) | 0.20 | 0.40 | 0.60 | 0.80 | 1.00 | 1.20 | 1.40 | 1.60 | 1.80 | 2.00 |

Comparative Examples 1 to 10

Conductive adhesive resins were prepared in the same manner as in Examples 1 to 10, except that a nickel metal powder was used instead of the compressible conductive powder prepared by plating the surface of the polymer material containing the nitrogen gas with the nickel metal.

Experimental Examples

Experimental Example 1: Measurement Result of Adhesive Power

Conductive adhesive tapes were manufactured by applying the conductive adhesive resins prepared according to Examples 1 to 10 and Comparative Examples 1 to 10 on a cross section of a 25-μm PET film to a thickness of 20 μm. When 20 minutes elapsed after each of the conductive adhesive tapes, i.e., samples 1 to 10, was attached to a surface of a stainless material, adhesive power was measured by using a tension tester.

Figure 6:
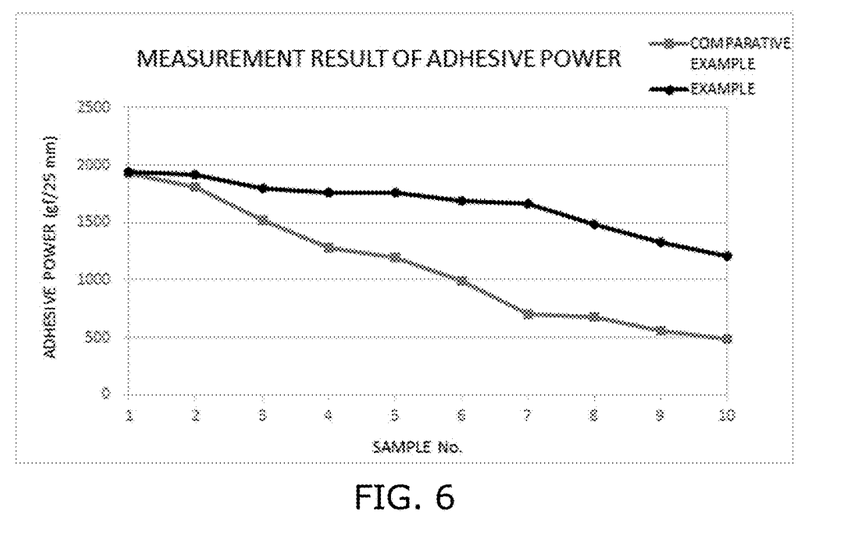
FIG. 6 is a graph showing measurement results of adhesion power of conductive adhesive tapes including the compressible conductive powder according to an embodiment of the present invention.

Table 2 and FIG. 6 show measurement results of adhesive power of the conductive adhesive tapes according to the present invention.

TABLE 2

(unit: gf/25 mm)

| Sample No. | 1 | 2 | 3 | 4 | 5 | 6 | 7 | 8 | 9 | 10 |
|---|---|---|---|---|---|---|---|---|---|---|
| Volume ratio (%) | 0.20 | 0.40 | 0.60 | 0.80 | 1.00 | 1.20 | 1.40 | 1.60 | 1.80 | 2.00 |
| Comparative Examples | 1,928 | 1,813 | 1,519 | 1,284 | 1,201 | 997 | 703 | 687 | 557 | 492 |
| Examples | 1,944 | 1,918 | 1,791 | 1,763 | 1,758 | 1,694 | 1,664 | 1,489 | 1,328 | 1,212 |

As the measurement results, adhesive power of Examples 1 to 10 using the compressible conductive powder is higher than that of Comparative Examples 1 to 10 using the nickel metal powder. In particular, as a volume ratio of powder is increased, an adhesive power difference is considerably increased. The increase in the adhesive power difference is caused by a difference between use effects of the compressible conductive powder and the general metal powder (see FIG. 3). This is because since a reduction ratio of adhesive power caused by a reduction in a contact area according to an increase in a content of the compressible conductive powder in Examples is lower compared to Comparative Examples including the general metal powder, stable adhesive power is securable.

Experimental Example 2: Measurement Results of Resistances

Conductive adhesive tapes were manufactured by applying the conductive adhesive resins prepared according to Examples 1 to 10 and Comparative Examples 1 to 10 on a cross section of an 18-um copper foil to a thickness of 20 µm. A horizontal resistance of an adhesive surface of each of the conductive adhesive tapes, i.e., samples 1 to 10, was measured.

Figure 7:
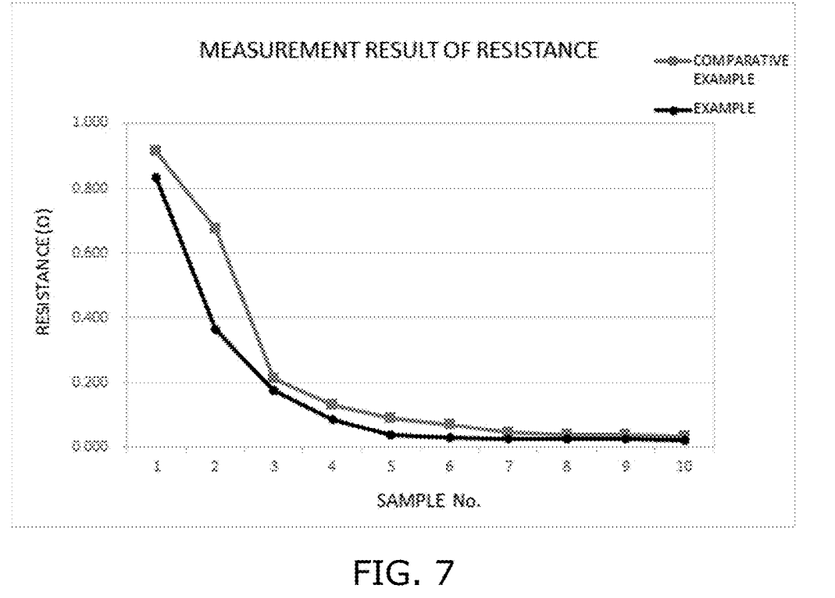
FIG. 7 is a graph showing measurement results of resistances of the conductive adhesive tapes including the compressible conductive powder according to the embodiment of the present invention.

Table 3 and FIG. 7 show measurement results of resistances of the conductive adhesive tapes manufactured according to the present invention.

TABLE 3

(unit: Ω)

| Sample No. | 1 | 2 | 3 | 4 | 5 | 6 | 7 | 8 | 9 | 10 |
|---|---|---|---|---|---|---|---|---|---|---|
| Volume ratio (%) | 0.20 | 0.40 | 0.60 | 0.80 | 1.00 | 1.20 | 1.40 | 1.60 | 1.80 | 2.00 |
| Comparative Examples | 0.916 | 0.673 | 0.212 | 0.131 | 0.089 | 0.068 | 0.045 | 0.039 | 0.038 | 0.031 |
| Examples | 0.834 | 0.362 | 0.174 | 0.084 | 0.036 | 0.028 | 0.024 | 0.025 | 0.024 | 0.021 |

As the measurement results, the resistances of Examples 1 to 10 using the compressible conductive powder are lower than those of Comparative Examples 1 to 10 using the nickel metal powder. In particular, even when a volume ratio of powder is low, it may be confirmed that the resistances of Examples are lower than those of Comparative Examples and conductivity of Examples is more excellent than that of Comparative Examples. The lower resistance and the more excellent conductivity of Examples are caused by a difference between use effects of the compressible conductive powder and the general metal powder (see FIG. 3). Even when a content of powder is low, due to an increase in a contact area, the conductivity of Example may be more excellent than that of Comparative Examples including the general metal powder.

Experimental Example 3: Measurement Results of Resistances According to Elapse of Time After Attachment Conductive adhesive tapes were manufactured by applying the conductive adhesive resins of Example 5 and Comparative Example 5 prepared such that powder was included in a volume ratio of 1.00%, on a cross section of an 18-um copper foil. After a copper foil was cut into two copper foils having a size of 10 mm×50 mm and the two copper foils were arranged at an interval of 25 mm, samples of Example 5 and Comparative Example 5, i.e., the conductive adhesive tapes were cut into a size of 10 mm×45 mm, and were attached to the two copper foils such that both ends of adhesive surfaces thereof had an area of 10 mm×10 mm. Immediately after the attachment, a horizontal resistance of the adhesive surface of each of the Example 5 and Comparative Example 5 was measured at an interval of 10 minutes.

Figure 8:
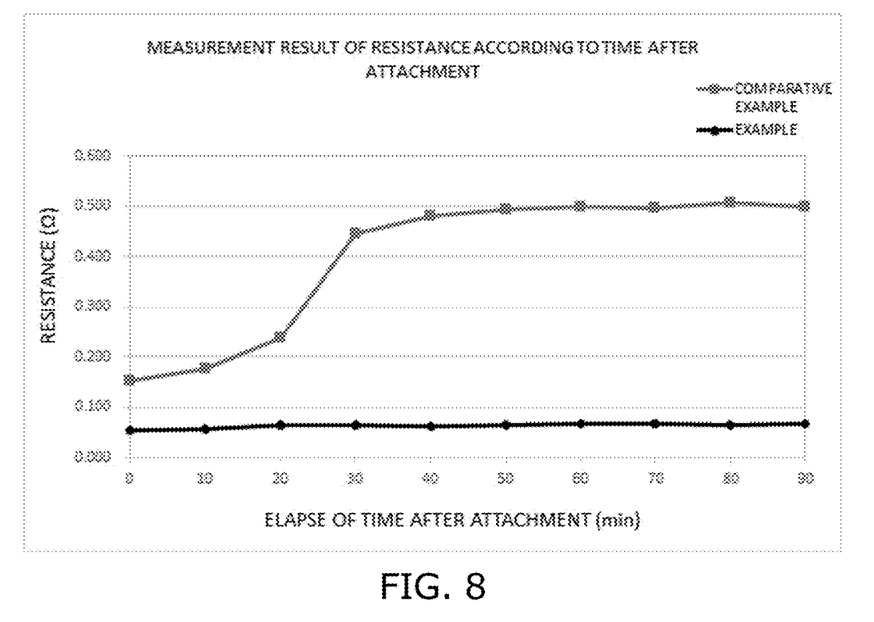
FIG. 8 is a graph showing a measurement result of a resistance of the conductive adhesive tape including the compressible conductive powder after elapse of time according to the embodiment of the present invention.

Table 4 and FIG. 8 show the measurement result of the resistances of the conductive adhesive tape manufactured according to the present invention according to elapse of time. A measurement value after elapse of time of 0 min was a resistance measured immediately after the attachment.

TABLE 4

(unit: Ω)

| Elapse of time | 0 | 10 min | 20 min | 30 min | 40 min | 50 min | 60 min | 70 min | 80 min | 90 min |
|---|---|---|---|---|---|---|---|---|---|---|
| Comparative Example | 0.152 | 0.176 | 0.238 | 0.446 | 0.481 | 0.495 | 0.498 | 0.497 | 0.507 | 0.499 |
| Example | 0.053 | 0.057 | 0.064 | 0.065 | 0.063 | 0.065 | 0.067 | 0.067 | 0.066 | 0.067 |

As the measurements, the resistance of Example 5 using the compressible conductive powder is lower than that of Comparative Example 5 including the nickel metal powder. In addition, although a time has elapsed after the attachment, it may be confirmed that Example 5 maintains a stable resistance. The maintenance of the stable resistance is caused by a difference between use effects of the compressible conductive powder and the general metal powder (see FIG. 3). In the case of Comparative Example 5 including the general metal powder, due to a repulsion phenomenon around powder after the attachment, a contact area is reduced, and thus, a rise extent of a resistance according to elapse of time is high. However, in the case of Example 5 including the compressible conductive powder, a contact area is maintained although a time has elapsed, and thus, a stable resistance may be maintained.

Accordingly, the present invention has been made in an effort to solve the above problems of the prior art. An aspect of the present invention is to manufacture a conductive adhesive tape by applying a conductive adhesive prepared by mixing a conductive powder having a metal-coated outer surface and an adhesive resin at a certain ratio on one surface or both surfaces of a conductive substrate, thereby allowing the conductive adhesive tape to be easily and evenly attached to an attachment surface by preventing a protrusion phenomenon through deformation characteristics with respect to pressing.

In addition, another aspect of the present invention is to manufacture a conductive adhesive tape by applying a conductive adhesive prepared by mixing a conductive powder having a metal-coated outer surface and an adhesive resin at a certain ratio on one surface or both surfaces of a conductive substrate, thereby stably maintaining and improving electrical characteristics by preventing a protrusion phenomenon through deformation characteristics with respect to pressing.

In the foregoing descriptions, although the present invention has been described in connection with the specific matters, such as the specific components, the specific embodiments, and the drawings, they are provided only for assisting in the understanding of the present invention, and the present invention is not limited to the embodiments. It will be apparent that those skilled in the art can make various modifications and changes thereto from these descriptions.

Therefore, the spirit of the present invention should not be limited to the aforementioned embodiments, and the appended claims and what are modified equally or equivalently thereto will be considered to fall within the scopes of the present invention.

DESCRIPTION OF THE REFERENCE NUMERAL

100: conductive adhesive tape
110: conductive substrate
120: conductive adhesive
130: release paper
140: conductive powder
141: soft polymer
142: gas-containing polymer
143: soft hollow type
144: metal-plated powder
144a: inner polymer spherical body
144b: metal plating
200: metal powder
300: adherend

What is claimed is:

1. A method of manufacturing a conductive adhesive tape, the method comprising:
    (a) expanding an outer shell of a polymer material so as to have a diameter of 0.001 mm to 1.00 mm while maintaining a glass transition temperature (Tg) of the outer shell of the polymer material containing a gas and expanded by heat;
    (b) cooling and hardening the expanded outer shell;
    (c) depositing a catalyst on a surface of the hardened outer shell;
    (d) preparing a conductive powder by coating the catalyst-deposited surface of the outer shell with a conductive metal layer;
    (e) preparing a conductive adhesive by mixing 0.2-30 parts by weight of the conductive powder into 100 parts by weight of an adhesive resin; and
    (f) manufacturing a conductive adhesive tape by applying the conductive adhesive prepared in the step (e) on one surface or both surfaces of a conductive substrate, a thickness of the conductive adhesive applied on the one surface or both surfaces of the conductive substrate being substantially equal to a diameter of the conductive powder.

2. The method of claim 1, wherein, in the step (d), the conductive metal layer is formed on an outer circumferential surface of the conductive layer by using an electrolytic or electroless plating solution.

3. The method of claim 2, wherein the plating solution comprises at least one selected from the group consisting of copper (Cu), nickel (Ni), silver (Ag), tungsten (W), gold (Au), and aluminum (Al).

4. The method of claim 1, further comprising attaching a release paper to a surface of the conductive adhesive of the conductive adhesive tape manufactured in the step (f).

* * * * *